United States Patent [19]

Trentelman

[11] Patent Number: 5,192,353
[45] Date of Patent: Mar. 9, 1993

[54] METHOD FOR PRESS MOLDING NEAR NET-SHAPE GLASS ARTICLES

[75] Inventor: Jackson P. Trentelman, Painted Post, N.Y.

[73] Assignee: Corning Incorporated, Corning, N.Y.

[21] Appl. No.: 682,556

[22] Filed: Apr. 9, 1991

[51] Int. Cl.$^5$ ............................................. C03B 11/12
[52] U.S. Cl. ........................................ 65/66; 65/137; 65/319; 65/374.13; 65/374.15
[58] Field of Search ................... 65/83, 66, 137, 319, 65/356, 355, 62, 305, 162, 374.13, 374.15; 264/1.1, 1.2, 327

[56] References Cited

U.S. PATENT DOCUMENTS

| | | | |
|---|---|---|---|
| 2,410,616 | 11/1946 | Webb | 65/162 |
| 3,244,497 | 4/1966 | Copeland | 65/356 |
| 3,598,558 | 6/1969 | Ayers | 65/162 |
| 4,094,657 | 6/1978 | Carmi | 65/356 |
| 4,168,961 | 9/1979 | Blair | 65/66 |
| 4,591,373 | 5/1986 | Sato | 65/102 |
| 4,913,718 | 4/1990 | Yoshimura | 65/104 |
| 4,969,440 | 11/1990 | Marechal | 65/64 |

FOREIGN PATENT DOCUMENTS 27216 10/1972 Japan .

OTHER PUBLICATIONS

Babcock, C. L., Forming in the Glass Industry, Chapter 95, 1983, pp. 431–444.

Primary Examiner—Joye L. Woodard
Attorney, Agent, or Firm—Timothy M. Schaeberle; Clinton S. Janes, Jr.

[57] ABSTRACT

There is disclosed a method for molding near net-shape glass articles. In general, the inventive method comprises two basic steps; (1) heating the receiving and opposing molding surfaces of a mold apparatus to different predetermined temperatures; and, (2) bringing the receiving and opposing molding surfaces of the mold into essential contact with each other and pressing a delivered molten glass charge for a time sufficient to remove enough heat from the charge such that the temperatures of the molding surfaces and the glass charge are all nearly at equilibrium below the glass charge's softening point. The press time and the differential mold heating combine to achieve symmetric heat removal, i.e. causing all temperatures to reach equilibrium at nearly the same time.

3 Claims, No Drawings

METHOD FOR PRESS MOLDING NEAR NET-SHAPE GLASS ARTICLES

RELATED APPLICATION

U.S. Ser. No. 07/682,553 filed concurrently herewith by R. Menihan et al. under the title Method and Apparatus for Parallel Alignment of Opposing Mold Surfaces is directed toward a method of press molding glass articles exhibiting parallel opposing surfaces. U.S. Ser. No. 07/682,657, filed concurrently herewith by Blakeslee et al. under the title Method for Forming Thin Flat Glass-Ceramic Articles is directed toward a method of forming glass-ceramic articles suitable for use as flat substrates in magnetic memory disc applications.

BACKGROUND OF THE INVENTION

This invention relates to a method for molding near net-shape glass articles. Specifically, this method is directed towards the production of glass articles which retain the shape imparted to them by, and do not warp as a result of, the pressing operation.

In glass pressing, the rapid and controlled exchange of heat between the glass and the mold equipment is extremely important. It is particularly important that the temperatures of the mold equipment be kept within a range which is most advantageous for the pressing process. This temperature should be below the "sticking" temperature, i.e., that temperature at which the glass tends to adhere to the mold equipment. However, the temperature should not be allowed to drop below the optimum forming temperature range as this may cause optical defects or checks in the product. Therefore, mold heating, prior to actual glass pressing, is an extremely important step in modern glass production and as such, it is well known in the art.

However, problems do exist in the prior art pressing methods, even though the first step, heating the molding apparatus to within the mold's operating temperature range, is utilized. Once the mold apparatus is heated, the molten glass charge is delivered to a receiving molding surface, whereupon the molding surfaces of the receiving portion and an opposing portion are essentially brought into pressing contact with each other to produce the desired article. Since the glass charge is being pressed therebetween it thus prevents the molding surfaces from undergoing actual contact.

During this pressing of a glass article, the glass charge is first displaced to form the part, then heat is removed during the dwell or press time. If heat is removed symmetrically about the center plane during dwell, then at the end of dwell the part will cool and not deform. However, if heat is removed non-symmetrically, more from the bottom molding surface than from the top surface, for example, then the part, upon cooling, will experience forces which deform it causing warping.

The problem with this prior art pressing method is the excess contact, i.e., excess gob-in-mold (GIM), time which the glass charge experiences with the receiving molding surface as compared to the opposing molding surface. The receiving and opposing molding surfaces experience equal contact time during the essential pressing stage; however, the receiving molding surface also undergoes contact time during the period starting at molten glass delivery and ending when essential pressing contact occurs between the receiving and opposing molding surfaces. This excess contact time, experienced by the glass charge in the receiving molding surface, resulted in more heat being removed from the surface of the glass charge in contact with the receiving portion, than from the opposing glass surface, whose only heat removal occurs during the contact time of essential pressing. As a result of this non-symmetric heat removal, articles regardless of their thickness and shape tended to warp. Thus, in order to obtain the desired shape the glass article required extensive secondary mechanical finishing such as grinding and polishing.

It is the solution of this warping problem to which the present invention is directed; i.e., the objective of this invention is to provide for a method of "symmetric heat removal" pressing for use in production of glass articles. Stated in another way, this invention's particular objective is to provide for a method of press molding glass articles which, following pressing, nearly possess the desired final glass article shape; simply termed near net-shape press molding for glass.

SUMMARY OF THE INVENTION

Whereas a mold assembly comprising several interacting parts can be designed to be operable in the inventive process, as a matter of convenience and in the interest of simplicity the following description will be directed to a two-part mold. The first part is termed the receiving molding surface because the viscous molten glass is initially brought into contact therewith, and the second part is termed the opposing molding surface because it is positioned opposite to the receiving molding surface and is brought into contact with the molten glass after the latter has been placed in the receiving molding surface.

Utilizing this apparatus a method for press molding near net-shape glass articles is described. In general, the inventive method comprises the steps of: (a) heating the said receiving and opposing molding surfaces to predetermined different temperatures; (b) delivering to the receiving molding surface a charge of molten glass of sufficient volume to form a glass article of desired shape and dimensions; (c) bringing the receiving and opposing molding surfaces of the mold into essential contact with each other and pressing the glass charge for a time sufficient to remove enough heat from the charge of molten glass such that the temperatures of the molding surfaces and glass charge are all nearly at equilibrium and below the glass charge's softening point, wherein said press time and mold temperature differential combine to achieve symmetric heat removal, thereby, causing the molding surface temperatures and charge temperature to reach equilibrium at nearly the same time; and, (d) removing the glass article from said mold.

This near net-shape press molding method, resulting in symmetric heat removal from a molten glass charge, produces glass articles which do not warp as a result of the press molding. Thus, the glass articles require little or no secondary finishing, i.e., grinding and polishing, to reach their final shape. This inventive method of press molding is effective for all types of glass articles, regardless of their dimensions and desired shapes.

PRIOR ART

U.S. Pat. No. 4,738,703 (Izumitani et al.) discloses a method of molding optical lenses wherein the mold is maintained at a temperature at least equal to the glass transition temperature prior to pressing the glass into a lens configuration. However, there is no mention of maintaining the receiving and opposing molding surfaces at different temperatures prior to receiving a charge of molten glass in order to achieve substantially symmetric heat transfer from the glass charge as disclosed in the present invention.

In U.S. Pat. No. 4,915,720 (Hirota et al.), a mold, with its upper and lower portions, as well as a glass preform are placed into a heating position where the entire unit is heated to such a temperature level that the viscosity of the glass preform is brought to within the range from $10^8$ to $10^{9.5}$ poises. The mold and preform are then moved to a pressing position where the glass article is then molded. Again, the entire mold, both upper and lower portions, is heated to the same temperature. That practice is thus easily distinguishable from the present invention's novel concept of differential mold heating.

U.S. Pat. No. 4,933,119 (Weymouth, Jr.) describes an apparatus and method for molding a plurality of articles having various masses and shapes. The upper and lower mold members are each maintained at an elevated temperature by separate heaters. However, there is no teaching in this patent to suggest individually maintaining these mold members at different temperatures.

U.S. Pat. No. 2,521,847 (Harr) discloses a method of and apparatus for heating and controlling the temperature of casting molds by the use of a heat transmitting fluid and a self-contained fluid supply unit. Unlike the present invention there is no reference to controlling the receiving and opposing molding surfaces at different temperatures to achieve substantially symmetric heat removal.

U.S. Pat. No. 4,364,878 (Laliberte et al.) discloses a method of and apparatus for molding precisely shaped plastic articles. This method and apparatus involves the controlled removal of heat from various areas of the surface of the mold cavity so as to prevent solidification of the injected plastic in any one portion thereof which could obstruct the compressive motion of a pressing insert trolled cooling, i.e., heat removal, is accomplished through a combined use of heat transfer passageways and conducting plugs, and thus it may be distinguished from the instant invention which utilizes differential, initial mold heating to accomplish the proper heat removal for producing non-warped and substantially flat glass articles.

DESCRIPTION OF THE PREFERRED EMBODIMENT

For the present invention to perform properly and thus ensure that near net shape pressing is achieved, the proper material for the mold tooling, both receiving and opposing molding surfaces, is the first consideration. The tooling must be comprised of a material to which molten glass will not stick, i.e, the material must exhibit non-stick surfaces. This ensures that the glass article, once formed, may be released freely from the mold. In other words, this method would not be appropriate for use with traditional metal tooling where, to some degree, the glass adheres to the tool surface and then must be "peeled away" to get the glass off the tool. Typically, in the glass industry, this non-stick character is accomplished through the use of parting agents, non-stick coatings or materials which possess inherent non-stick behavior. The preferred embodiment for the present inventive method comprises utilizing materials with the inherent non-stick behavior. In addition to this non-stick behavior, it is also desirable that the material used for the mold tooling possess near zero thermal expansion characteristics. Representative materials possessing these characteristics include boron nitride and its composites, silicon carbide, graphite and pyrolytic graphite. However, the most preferred embodiment comprises using either silicon carbide coated graphite or boron nitride for the mold's receiving and opposing surfaces.

Once the molding surfaces are comprised of the proper material, the first step involves heating the receiving and opposing molding surfaces to predetermined different temperatures. The actual heat differential (° C.) required between the receiving and opposing molding surfaces to achieve symmetric heat removal from the opposing surfaces of a glass charge is dependent upon a number of factors: (1) the pressing or dwell time required for the formation of the resultant glass article; (2) the material used for the receiving and opposing molding surfaces; (3) the dimensions of the resultant glass articles; and, (4) the excess gob-in-mold (GIM), or excess contact time the glass charge has with the mold receiving surface. The illustrations to follow, all resulting in symmetric heat removal, i.e., near net-shape pressed articles, list examples of typical temperature differentials, as well as illustrate that the differential varies with changes in the above listed factors.

Although the size of the temperature differential is not fixed, it is known that the differential range can be no larger than the operating range of the molding material itself. In other words the upper limit of the differential is the mold material "sticking" temperature; the molding surface having the higher temperature cannot be heated above the temperature at which molten glass will stick to, even non-stick, molding surfaces. Secondly, the lower limit of the differential is the "optical check or defect" temperature; the molding surface set at the lower temperature may not be maintained below the point at which checks or optical defects begin to develop in the final glass product. This mold operating range, however, would vary depending on the starting glass composition utilized.

To effectively utilize this forming method it is necessary to incorporate within the system a means for controlling the tooling surface temperatures which has a requisite temperature control precision of within $+/-5°$ C. of a required set point. More preferably, the controlling means should possess a controlling precision of at least $+/-2°$ C. Assuming the more preferred range, any method of temperature control which has the required precision to maintain this temperature range would be suitable in the preferred embodiment for this method.

The most preferred embodiment involves maintaining the receiving molding surface at a higher temperature than that of the opposing molding surface to compensate for the excess contact time that the glass charge has therewith prior to the essential pressing contact with the opposing molding surface. Whereas it is generally more practical to maintain the receiving surface at a higher temperature through the use of materials exhibiting- the necessary thermal properties, that practice may not be required. It is only necessary that symmetric heat removal be achieved. In this way, warping is avoided as the glass article cools, and near net-shape pressed glass articles are produced.

Once the mold surfaces are differentially maintained at the proper temperatures the next steps actually involve forming or pressing the glass charge to form the glass article of the desired shape. First, a molten glass charge of sufficient volume to form the desired article is delivered to the receiving molding surface. The glass charge should have a viscosity range within $10^2-5 \times 10^3$ poise. It is during this time that the receiving molding surface "excess contact time" occurs. Secondly, the receiving and opposing molding surfaces are then brought into essential contact (the glass charge being pressed therebetween prevents actual contact) with each other and the glass charge is pressed wit a load sufficient to form the glass article of desired shape. The glass charge is pressed for a time sufficient to remove enough heat from the delivered glass charge that the temperatures of the molding surfaces and glass charge are all nearly at equilibrium below the glass charges softening point. The combination of the differential mold surface temperatures and the excess press time allows the glass charge to experience symmetric heat removal. Additionally, as a result of this combination, the temperatures of the molding surfaces and the glass charge reach equilibrium at nearly the same time. Upon the completion of the pressing operation, the near net-shape glass article is removed from the receiving molding surface.

This above described inventive method of pressing is particularly applicable to the production of glass articles (subsequently heat treated to form a glass-ceramic) which are suitable for use as flat, rigid disk substrates used in magnetic memory storage devices, and, because of that factor all the following illustrations are of glass articles of this disc-shaped type. The glass articles produced in the following illustrations are compositionally comprised of the materials which constitute the precursor glass used for the canasite glass-ceramic, marketed as Corning Code 9634, by Corning Incorporated, Corning, N.Y. The precursor glass consists essentially, in weight percent on the oxide basis, of about 57.3% $SiO_2$, 2.0% $Al_2O_3$, 20.2% CaO, 8.0% $Na_2O$, 8.8% $K_2O$, 0.2% $Sb_2O_3$ and 6.2% F. The excess contact time with the receiving molding surface which occurs for all the subsequent illustrations is approximately 3.5 secs.

ILLUSTRATION 1

In the first illustration the glass article possessed a constant thickness of 0.60", a diameter of 5.35" for samples 1 and 2, and 3.8" for samples 3 through 6. The dwell-time, i.e., pressing-time, also constant, was 1.5 sec. From the data in Table I, which lists the molding temperatures of the receiving ($T_R$) and opposing ($T_O$) molding surfaces, the material type (mat'l type), and the differential between the surfaces (temp differ'l), it is seen that the temperature offset required for substantial flatness, varies as the tooling material itself is varied.

TABLE I

|  | 1 | 2 | 3 | 4 | 5 | 6 |
|---|---|---|---|---|---|---|
| $T_R$ (°C.)/ mat'l type* | 435/B | 420/B | 415/D | 440/C | 445/E | 450/F |
| $T_O$ (°C.)/ mat'l type* | 370/A | 400/B | 412/C | 415/E | 430/C | 415/C |
| Temp. differ'l (°C.) | 65 | 20 | 3 | 25 | 15 | 35 |

*Tooling Materials

| Material | Material Type |
|---|---|
| A | HP (high purity) Grade Boron Nitride: Carborundum |
| B | 90% Boron Nitride/10% Aluminum Nitride Composite |
| C | 70% Boron Nitride/30% Aluminum Nitride Composite |
| D | Graphite impregnated with an Oxygen inhibitor |
| E | Silicon Carbide coated Graphite |

TABLE I-continued

| F | Graphite impregnated with Nickel and Chromium |
|---|---|

ILLUSTRATION 2

This illustration, having samples produced by a common tooling material of pyrolytic graphite coated graphite and possessing a constant thickness and diameter of 0.60" and 3.8", respectively, shows the effect of dwell or pressing time (dwell) on the required temperature differential (temp differ'l). It can be inferred from Table III that as the dwell-time, i.e., pressing-time, is increased the temperature offset between the molding surfaces is decreased.

TABLE II

| Dwell(t) | $T_O$ (°C.) | $T_R$ (°C.) | Temp. diff'l (°C.) |
|---|---|---|---|
| 1.35 sec. | 390 | 480 | 90 |
| 1.5 sec. | 400 | 470 | 70 |
| 1.65 sec. | 410 | 460 | 50 |

ILLUSTRATION 3

Lastly, Illustration 3, tool material comprised of high purity boron nitride and a constant dwell-time and diameter of 1.5 secs of 3.8", respectively, illustrates the effect of the glass article thickness on the required temperature offset. Implicit in Table III is the fact that an increased article thickness requires an increased temperature differential in order to produce substantially flat glass articles.

TABLE III

| Article thickness | $T_R$ (°C.) | $T_O$ (°C.) |
|---|---|---|
| .065" | 450 | 390 |
| .050" | 450 | 410 |

While a particular embodiment of the invention has been shown and described, various modifications are within the scope of the invention. The appended claims are, therefore, intended to cover all such modifications.

I claim:

1. A method for press molding a near net-shape glass article utilizing a mold having receiving and opposing molding surfaces, which comprises the steps of:
   a) preheating said receiving and opposing molding surfaces to different predetermined preheat temperature, said predetermined preheat temperature of said receiving surface being greater than said predetermined preheat temperature of said opposing molding surface;
   b) maintaining, within a tolerance of 5° C., said predetermined preheat temperature of said receiving molding surface;
   c) maintaining, within a tolerance of 5° C., said predetermined preheat temperature of said opposing molding surface;
   d) delivering to said receiving molding surface a charge of molten glass of a predetermined volume to form a glass article of desired shape and dimensions;
   e) bringing said receiving and opposing molding surfaces of said mold into close proximity with each other;
   f) pressing said charge for a press time sufficient to symmetrically transfer enough heat from said charge of molten glass such that the temperature of the molding surfaces and said glass charge are all nearly simultaneously made nearly equal and are below said glass charge's softening point thereby forming said glass article from said glass charge; and g) removing said glass article from said receiving molding surface.

2. A method according to claim 1, wherein said predetermined preheat temperatures of said receiving molding surface and said opposing molding surface are dependent upon the shape and dimensions of said desired glass article, the composition of the material comprising said mold surfaces, said press time, and upon an amount of time said glass charge remains in said receiving mold surface prior to pressing.

3. A method according to claim 1 wherein said molding surfaces are comprised of a material which exhibits near zero thermal expansion and possesses a substantially non-stick surface, said material selected from the group consisting of boron nitride composites, silicon carbide, silicon carbide coated graphite, and pyrolytic graphite.

* * * * *

UNITED STATES PATENT AND TRADEMARK OFFICE
CERTIFICATE OF CORRECTION

PATENT NO. : 5,192,353
DATED : March 9, 1993
INVENTOR(S) : Jackson P. Trentelman It is certified that error appears in the above-identified patent and that said Letters Patent is hereby corrected as shown below:

Column 3, lines 39-40, change "insert trolled cooling", to --insert until the entire injected plastic has solidified. This controlled cooling--.

Column 4, lines 58-59, change "exhibiting-" to --exhibiting--.

Column 5, line 8, change "wit" to --with--.

Column 7, line 8, remove the comma after "claim 1".

Signed and Sealed this

Eighteenth Day of January, 1994

Attest:

BRUCE LEHMAN

Attesting Officer      Commissioner of Patents and Trademarks